June 30, 1925. 1,543,885
A. C. TAYLOR ET AL
TILTABLE SUPPORT FOR AUTOMOBILE HEADLIGHTS
Filed March 31, 1924
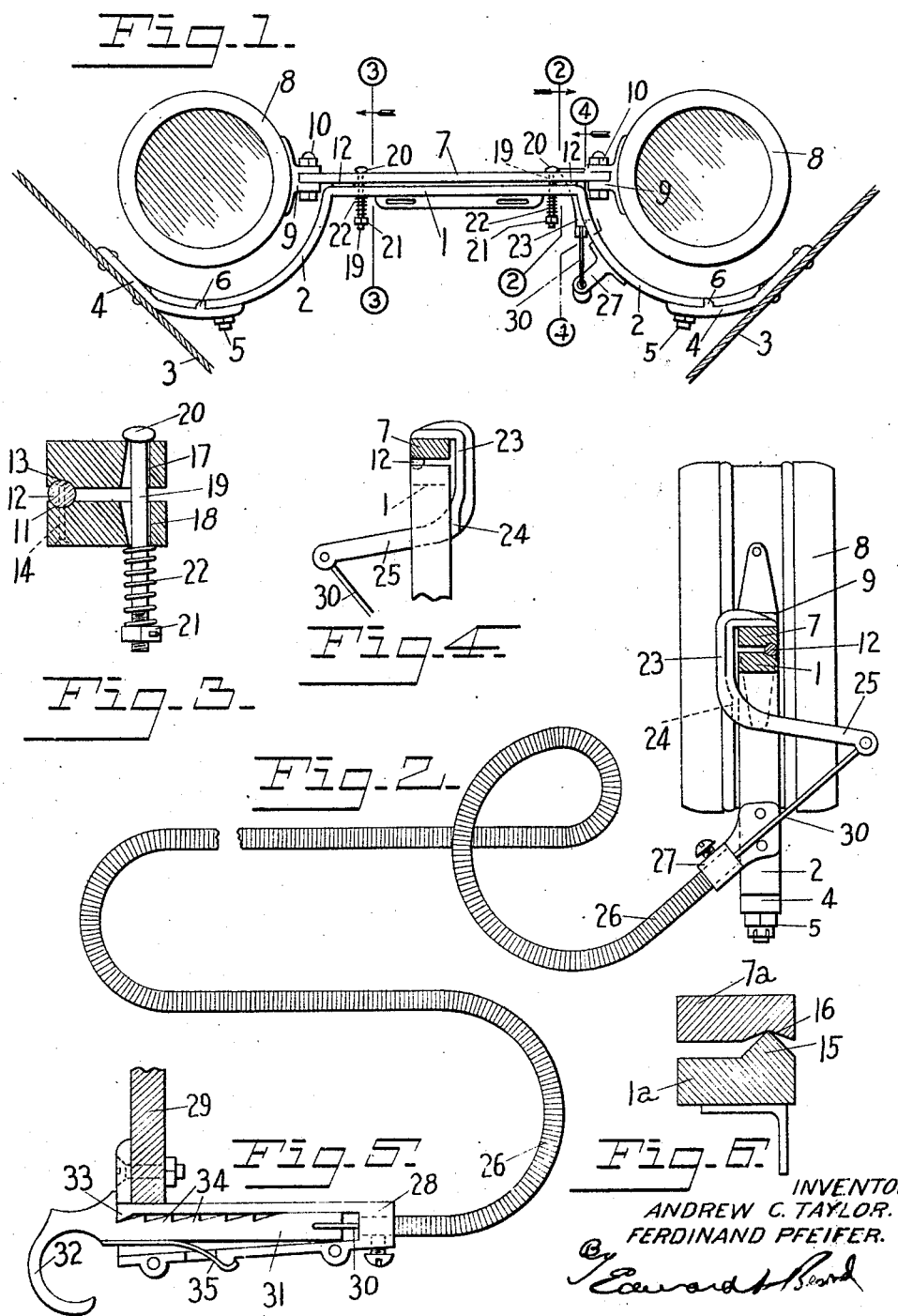
INVENTORS.
ANDREW C. TAYLOR.
FERDINAND PFEIFER.
ATTORNEY.

Patented June 30, 1925.

1,543,885

UNITED STATES PATENT OFFICE.

ANDREW C. TAYLOR, OF MARYSVILLE, AND FERDINAND PFEIFER, OF SPRINGFIELD, OHIO; SAID PFEIFER ASSIGNOR, BY MESNE ASSIGNMENTS, TO SAID TAYLOR.

TILTABLE SUPPORT FOR AUTOMOBILE HEADLIGHTS.

Application filed March 31, 1924. Serial No. 703,073.

*To all whom it may concern:*

Be it known that we, ANDREW C. TAYLOR, a citizen of the United States, residing at Marysville, in the county of Union and State of Ohio, and FERDINAND PFEIFER, a citizen of the United States, residing at Springfield, in the county of Clark and State of Ohio, have invented certain new and useful Improvements in Tiltable Supports for Automobile Headlights, of which the following is a specification, reference being had therein to the accompanying drawing.

This invention relates to tiltable supports for automobile headlights, the purpose of the device being to so direct the rays of light from the headlights that while they will still illuminate the road in front of the automobile the glare will be removed from the eyes of an approaching driver. Various devices have been proposed heretofore for accomplishing this result but none has been wholly satisfactory.

One object of the invention is to provide a tiltable support of this kind which will be simple in its construction, easy of operation, and which will be of such a character that it will not be caused to rattle by the vibration of the automobile.

A further object of the invention is to provide a headlight support of this character consisting of a main supporting unit rigidly mounted on the automobile and a lamp supporting unit pivotally mounted on the main support and carrying both the headlights.

A further object of the invention is to provide an improved operating device for controlling the position of the headlights.

Other objects of the invention will appear as the device is described in detail.

In the accompanying drawings Fig. 1 is a front elevation of a device embodying our invention; Fig. 2 is a section taken on the line 2—2 of Fig. 1, looking in the direction of the arrows and showing the lamp in elevation; Fig. 3 is a section taken on the line 3—3 of Fig. 1; Fig. 4 is a section taken on the line 4—4 of Fig. 1, looking in the direction of the arrows; Fig. 5 is a detail view of a portion of the actuating device showing the cover plate removed from the housing; and Fig. 6 is a sectional detail view of a modified form of pivot.

In these drawings we have illustrated one embodiment of our invention, with a slight modification thereof, but it will be understood that this particular embodiment has been chosen for the purpose of illustration only and that the device may take various forms without departing from the spirit of the invention.

In that form here shown the device comprises a main supporting unit or frame adapted to be secured at its ends to the automobile and, as here shown, this supporting unit or frame comprises a substantially horizontal transverse portion 1 which is of a length somewhat less than the distance between the two headlights. At each end of this intermediate portion is a downwardly and outwardly extending portion 2 which, in the present instance, is curved and is provided at its outer end with means for securing it to the automobile. The ends of this frame may be attached at any suitable part of the automobile and the attaching means may be of any suitable kind but we have, in the present device, shown the frame as mounted on the fenders, portions of which are shown at 3 in the drawings. In order that the frame may be adapted for application to cars of various kinds we prefer that the attaching means should be separable from the portions 2 of the frame and we have here shown them as comprising brackets 4 which are detachably secured to the respective ends of the downwardly extending parts 2 of the frame by means of bolts 5 and lugs 6 and are riveted or otherwise secured to the fenders. The frame may be of any suitable construction but preferably the intermediate portion 1 and the end portions 2 are formed integral and, as here shown, they are formed from flat bar stock, of proper width and thickness, which is bent to the desired shape, thus providing the intermediate portion of the frame with a flat upper surface.

A lamp supporting unit is pivotally mounted on the frame and carries both the headlights. As here shown, this lamp supporting unit comprises a member or bar 7 which is supported by the intermediate portion 1 of the frame and is provided at its ends with means for supporting the headlights 8. In the present construction, this lamp supporting member consists of a straight flat bar and is of a length slightly greater than the length of the intermediate portion 1 of the frame so that its ends extend slightly beyond said portion of the frame and are adapted to receive the lamp brackets 9 which are secured thereto by bolts 10 extending through the brackets and through the respective ends of the lamp supporting member. The lamp supporting member being formed of flat stock is provided with a flat lower face which is opposed to the flat upper face of the intermediate portion of the frame 1. The frame and the lamp supporting member are pivotally connected one to the other on axes extending lengthwise thereof and preferably arranged adjacent to the forward edges of the two parts so as to permit of a relatively large forward tilting movement on the part of the lamp supporting member. The pivotal connection may take various forms but we prefer to provide one of the parts with a pivot member or members and to provide the other part with a recess or recesses to receive said pivot members. In the present construction the two parts are pivotally connected at two points arranged near the respective ends thereof and, as here shown, the intermediate portion 1 of the main frame is provided near each end with a longitudinal recess 11 in which is seated a cylindrical pivot member 12, this member extending parallel with the edge of the frame member. The lamp supporting member is provided with a corresponding recess 13 in its lower face, near each end thereof, which recesses are adapted to receive the upper portions of the respective pivot members 12. The combined depth of the opposed recesses 11 and 13 is considerably less than the diameter of the pivot member 12. Consequently the adjacent portions of the frame and lamp supporting member are spaced apart and the lamp supporting member is free to move about the pivot member. If desired, the pivot member may be anchored in the recess 11 of the frame and, in the present instance, we have shown the same as secured in place by a pivot 14 but this is merely to prevent the accidental displacement of the pivot member when the frame and lamp supporting member are separated and is not essential to the operation of the device.

It will be obvious that the pivot member may take various forms and in Fig. 6 we have shown a slight modification of the same in which the frame member 1ª has formed integral therewith an upwardly extending V-shaped projection 15 which constitutes the pivot member and which engages a V-shaped seat or recess 16 in the lamp supporting member 7ª.

The pivotal connection between the two parts of the device does not in itself serve to hold them together and we have provided a yieldable device which serves both to hold the two units of the supporting structure against relative displacement and to permit of the tilting movement of the lamp supporting member. In the present device we have provided both the lamp supporting member and the intermediate portion 1 of the frame with alined apertures 17 and 18, there being a pair of these apertures adjacent to each pivot. A rod or bolt 19 extends loosely through these apertures and is supported on the lamp supporting member 7 by its head 20. The lower end of the rod 19 extends some distance below the intermediate portion 1 of the frame and has mounted thereon a stop, such as a nut 21, between which and the frame is confined a coiled spring 22 which so acts on the bolt as to resist the movement of the lamp supporting member about its axis and to hold the same normally in a substantially horizontal position. The frame and the lamp supporting member have cooperating parts which limit the rearward movement of the lamp supporting member about its axis. If desired, the two members may be so arranged that their rear edges will contact and thus serve to limit the movement of the lamp supporting member but we have found that because of the short distance between these rear edges and the axis of the lamp supporting member the vibration of the machine will sometimes cause the lamp supporting member to vibrate and rattle. To avoid this rattle we have arranged the cooperating parts at a point spaced some distance from the axis of the lamp supporting member and, as here shown, we have rigidly secured to the lamp supporting member 7 a downwardly extending arm 23 having a laterally extending portion or stop 24 arranged to engage the rear edge of the adjacent downwardly and outwardly extending part 2 of the frame, the stop being so arranged that when in contact with the frame the lamp supporting member will be supported in its normal position which, in the present instance, is its horizontal position, the spring 22 serving to hold the stop firmly in contact with the frame.

Any suitable means may be provided for moving the lamp supporting unit about its axis and for retaining the same in adjusted position. This means should, however, be of such a character that it can be manipulated by the driver from his seat and, in the present construction, we have provided the arm 23 with a forwardly extending portion 26 which is connected with an actuating device extending rearwardly and having an operating member mounted on the instrument board of the automobile. As here shown, this actuating device comprises a flexible tube 26 anchored at its forward end in a bracket 27 rigidly secured to the supporting frame and anchored at its rear end in a bracket 28 rigidly secured to the instrument board 29. Extending through this flexible tube and slidable therein is a flexible rod or wire 30, the forward end of which is connected with the forwardly extending portion 25 of the arm 23 and the rear end of which is connected with an operating member 31 slidably mounted in the bracket 28, which is preferably in the form of a housing beyond the rear end of which the operating member 31 projects and is provided with a finger grip 32. The housing 28 is provided at its rear end, above the operating member 31, with a projection or lip 33 adapted to cooperate with teeth 34 formed on the upper edge of the operating member to hold the latter in adjusted positions, a spring 35 serving to press the operating member into constant engagement with the lip 33. It will be apparent, therefore, that a pull on the operating member will tilt the lamp supporting unit against the action of the springs 22 and that the teeth 34 engaging the lip 33 will prevent the rearward movement of the lamp unit until the operating member is released from the lip 33. As soon as this is done the springs return the lamp unit to its normal position and move the stop 24 into contact with the frame.

It will be apparent that we have provided a lamp supporting structure which is very simple in its construction, consisting of two units, and that these units consist of but a few parts, the parts being of such a character that the device can be produced at a low cost, and the two units being connected in such a manner that the device is very easy to operate. It will be noted that the lamp brackets 9, by means of which the lamps are secured to the supporting member 7, are arranged centrally of the respective lamps so that these lamps are substantially balanced about the axis of the lamp supporting member 7 and have little or no tendency to tilt the lamp unit in either direction. Consequently there is normally no tendency to compress the springs 22 and consequently a little tendency to rattle and this is entirely overcome by the springs and the arrangement of the stop 24. The rigid transverse frame not only provides a support for the lamp unit but, when mounted on the fenders, provides a rigid brace for the fenders and does away with the necessity for a special brace rod.

While we have shown and described one embodiment of our invention we wish it to be understood that we do not desire to be limited to the details thereof as various modifications may appear to a person skilled in the art.

Having now fully described our invention, what we claim as new and desire to secure by Letters Patents, is:

1. A tiltable support for automobile headlights comprising two substantially parallel members arranged side by side and adapted to extend across the front of an automobile, one of said members having means for securing the same to said automobile and constituting a main frame, the other of said members having means for supporting headlights near the respective ends thereof, a hinged connection between said members to permit the last mentioned member to move about a longitudinal axis with relation to the first mentioned member, and means for controlling the movement of said last mentioned member about said axis.

2. A tiltable support for automobile headlights, comprising two members adapted to extend transversely to an automobile, one of said members having near its respective ends means for rigidly securing the same to said automobile, the other of said members having means to support headlights near the respective ends thereof, said members having intermediate portions arranged side by side, hinged connections between said intermediate portions of said members to permit the last mentioned member to have movement about a longitudinal axis with relation to the first mentioned member, and means for moving said last mentioned member about said longitudinal axis and for holding the same in adjusted positions.

3. A tiltable support for automobile headlights, comprising two substantially parallel members arranged side by side and adapted to extend across the front of an automobile, one of said members constituting a frame and having means at the respective ends thereof for rigidly but detachably securing the same to said automobile, the other of said members having means for supporting headlights near the respective ends thereof, a hinged connection between said members to permit the last mentioned member to move about a longitudinal axis with relation to the first mentioned member, and means for moving said last mentioned member about said axis and for holding the same in adjusted positions.

4. A tiltable support for automobile headlights, comprising two members arranged side by side, and adapted to extend across the front of an automobile, one of said members constituting a frame and comprising an intermediate portion and downwardly and outwardly extending end portions having means for securing the same to an automobile, the other of said members having a portion extending substantially parallel with the intermediate portion of the first mentioned member and having means for supporting headlights at the respective ends thereof and adjacent to the downwardly and outwardly extending portions of the first mentioned member, a hinged connection between the last mentioned member and the intermediate portion of the first mentioned member to permit said last mentioned member to move about a longitudinal axis with relation to said first mentioned member, and means for moving said last mentioned member about said axis.

5. A tiltable support for automobile headlights comprising two members arranged one above the other and adapted to extend across the front of an automobile, one of said members constituting a frame and comprising an intermediate portion and end portions having means for securing the same to an automobile, the other of said members extending substantially parallel with the intermediate portion of said frame member and having means for supporting headlights beyond the respective ends of said intermediate portion of said frame member, said lamp supporting member and said intermediate portion of said frame member being pivotally connected one to the other near their forward ends, and means for moving said lamp supporting member about said pivotal connection.

6. In a pivotal support for automobile headlights, a transverse frame having means for rigidly securing the same to the automobile, a lamp supporting member mounted on said frame and having means for supporting headlights at the respective ends thereof, said frame and said member being pivotally connected at their forward edges, a yieldable device to resist the forward movement of said lamp supporting member about said pivotal connection, said frame and said lamp supporting member having cooperating parts to limit the rearward movement of said lamp supporting member, and means for actuating said lamp supporting member.

7. In a pivotal support for automobile headlights, a transverse frame having means for rigidly securing the same to the automobile, a lamp supporting member mounted on said frame and having means for supporting headlights at the respective ends thereof, said frame and said member being pivotally connected at their forward edges, a yieldable device to resist the forward movement of said lamp supporting member about said pivotal connection, said frame and said lamp supporting member having cooperating parts spaced from the rear edge of said lamp supporting member, and means for moving said lamp supporting member about said pivotal connection.

8. In a pivotal support for automobile headlights, a transverse frame having means for rigidly securing the same to the automobile, a lamp supporting member mounted on said frame and having means for supporting headlights at the respective ends thereof, a downwardly extending arm carried by said lamp supporting member and arranged to engage said frame at a point below and spaced from said lamp supporting member, and means for moving said lamp supporting member about said pivotal connection.

9. In a tiltable support for automobile headlights, a transverse frame member having means for rigidly securing the same to an automobile, a lamp supporting member mounted on said frame and having means for supporting headlights near the respective ends thereof, one of said members having parts projecting from that side thereof adjacent to the other member and constituting pivots, the other of said members having open bearings to receive said pivots and support said lamp supporting member thereon, and means for moving said lamp supporting member about said pivots.

10. In a tiltable support for automobile headlights, a transverse frame having means for rigidly securing the same to the automobile, a lamp supporting member mounted on said frame and having means for supporting headlights at the respective ends thereof, pivot members carried by one of said members, the other of said members having recesses to receive the respective pivot members, yieldable means for retaining said lamp supporting member in engagement with said pivot members, and means for moving said lamp supporting member about said pivot members.

11. In a tiltable support for automobile headlights, a transverse frame having means for rigidly securing the same to the automobile, a lamp supporting member mounted on said frame and having means for supporting headlights at the respective ends thereof, pivot members carried by one of said members, the other of said members having recesses to receive the respective pivot members, a spring controlled device acting on said lamp supporting member to retain the same in contact with said pivot members and to resist the forward movement thereof about said pivot members, and means to impart forward movement to said lamp supporting member against the action of said spring controlled device.

12. In a pivotal support for automobile headlights, a transverse frame having means for rigidly securing the same to the automobile, a lamp supporting member mounted on said frame and having means for supporting headlights at the respective ends thereof, pivot members carried by said frame, said lamp supporting member having recesses to receive said pivot members, and means for moving said lamp supporting member about said pivot members.

13. In a pivotal support for automobile headlights, a transverse frame having means for rigidly securing the same to the automobile, a lamp supporting member mounted on said frame and having means for supporting headlights at the respective ends thereof, said parts having a pair of opposed longitudinal recesses near each end thereof, a pivot member mounted in each pair of recesses, and means for moving said lamp supporting member about said pivot members.

14. In a pivotal support for automobile headlights, a transverse frame having means for rigidly securing the same to the automobile, a lamp supporting member mounted on said frame and having means for supporting headlights at the respective ends thereof, pivot members carried by one of said parts near the forward edge thereof, the other of said parts having recesses to receive the respective pivot members, said frame having an aperture near the rear edge thereof, a rod carried by said lamp supporting member and extending loosely through the aperture in said frame, a spring acting on said rod to resist the forward movement of said lamp supporting member about its axis, and means for moving said lamp supporting member against the action of said spring.

15. In a pivotal support for automobile headlights, a transverse frame having means for rigidly securing the same to the automobile, a lamp supporting member mounted on said frame and having means for supporting headlights at the respective ends thereof, pivot members carried by one of said parts near the forward edge thereof, the other of said parts having recesses to receive the respective pivot members, said frame having an aperture near the rear edge thereof, a rod carried by said lamp supporting member and extending loosely through the aperture in said frame, a spring acting on said rod to resist the forward movement of said lamp supporting member about its axis, a stop carried by said lamp supporting member and engaging said frame to limit the rearward movement of said lamp supporting member, and means for imparting forward movement to said lamp supporting member against the action of said spring.

16. In a tiltable support for automobile headlights, a transverse frame having means for rigidly securing the same to the automobile and having pivot members near the forward edge thereof, a lamp supporting member resting upon said frame, having recesses to receive the respective pivot members and having means to support lamps at the respective ends thereof, yieldable means acting on the rear edges of said frame and said lamp supporting member to retain the latter on said frame and to resist its forward movement about said pivot members, and means to move said lamp supporting member about said pivot members.

17. A tiltable support for automobile headlights comprising two units, each of said units comprising a part extending transversely to the automobile and the transverse parts of the two units being arranged side by side, one of said units having means for rigidly securing the same to the fenders on the opposite sides of the automobile and the other of said units having means for supporting headlights at the respective ends thereof, the transverse portions of the two units being hinged one to the other to permit the lamp supporting unit to have movement about a longitudinal axis with relation to the first mentioned unit, and means for moving said lamp supporting unit about said longitudinal axis.

18. In a tiltable support for automobile headlights, a transverse frame having a substantially horizontal intermediate portion and downwardly and outwardly curved end portions, said end portions having means for rigidly securing the same to the fenders of an automobile, a lamp supporting member mounted on the horizontal portion of said frame and pivotally connected therewith near the forward edge thereof, a yieldable device acting on the rear edge of said lamp supporting member to resist its forward movement about said pivotal connection, a downwardly extending arm rigidly secured to said lamp supporting member and having a part spaced from said lamp supporting member and arranged to engage said frame to limit the rearward movement of said lamp supporting member, said arm having a forwardly extending part, and a flexible actuating device connected with said forwardly extending part of said arm.

In testimony whereof, we affix our signatures hereto.

ANDREW C. TAYLOR.
FERDINAND PFEIFER.